(12) United States Patent
Liu et al.

(10) Patent No.: US 8,818,033 B1
(45) Date of Patent: Aug. 26, 2014

(54) SYSTEM AND METHOD FOR DETECTING EQUATIONS

(75) Inventors: Zongyi Liu, Issaquah, WA (US); Raymond Wensley Smith, Los Altos, CA (US)

(73) Assignee: Google Inc., Mountain View, CA (US)

( * ) Notice: Subject to any disclaimer, the term of this patent is extended or adjusted under 35 U.S.C. 154(b) by 270 days.

(21) Appl. No.: 13/458,654

(22) Filed: Apr. 27, 2012

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS

2004/0175037 A1* 9/2004 Guleryuz ..................... 382/180

OTHER PUBLICATIONS

Kacem et al., "Automatic Extraction of Printed Mathematical Formulas", International Journal on Document Analysis and Recognition, 2001, vol. 4, No. 2, pp. 97-108.
Lavirotte et al., "Mathematical Formula Recognition Using Graph Grammar", Proceedings of SPIE, Apr. 1998, vol. 3305, pp. 44-52.

* cited by examiner

*Primary Examiner* — Atiba O Fitzpatrick
(74) *Attorney, Agent, or Firm* — Dority & Manning, P.A.

(57) ABSTRACT

A system and method of extracting formulas in an electronic image of a document using optical character recognition (OCR) is disclosed. In one example, the method comprises analyzing the electronic image, including a plurality of text lines, to generate a plurality of bounding blocks, each bounding block associated with a text line detected within the electronic image, searching the plurality of text lines to detect at least one character matching one of a plurality of character groups, calculating a symbol density of each of the plurality of character groups for each of the plurality of text lines, and classifying each of the plurality of text lines as at least one of an equation block type, an inline equation block type, and a descriptive block type, based on the symbol density, wherein each of the plurality of text lines classified as the equation block type is extracted.

12 Claims, 4 Drawing Sheets

SYSTEM AND METHOD FOR DETECTING EQUATIONS

BACKGROUND

Optical character recognition (OCR) uses computer software (or an OCR engine), to process digital images of printed, typewritten, handwritten, or other written text, whether originally on paper, microfilm, or other medium, and to produce machine recognizable and editable text from the images. The digital image of a document processed by the OCR engine may include images of multiple pages of written material. The images of the text to be processed by the OCR engine may be obtained by various imaging methods including using an image scanner to capture digital images of the text. The OCR engine analyzes the scanned image and produces an output document which includes the imaged document converted into standard character text.

SUMMARY

The OCR engine may be used to detect mathematical formulas or expressions. Such mathematical formulas or expressions may be present in a number of scientific, mathematical and engineering texts. Because mathematical formulas differ in the form of the expression from standard text, it is appreciated that conventional OCR engines may have difficulty with analyzing mathematical expressions as standard text. Standard text is usually disposed in a single line and contains characters that are discrete and typically include mostly similar size and font. By contrast, it is appreciated that mathematical expressions may include characters or numbers that may be located in two-dimensions (e.g. above and below a line of text) and such expressions may further include multiple character sizes, fonts and languages. Operands, such as, for example a square root, may span different distances based on the number of characters in the mathematical expression, and therefore, these operands may be difficult to detect consistently due to variation. Further, other mathematical expressions, such as matrices, may span multiple lines.

To accurately analyze mathematical expressions, conventional OCR engines may need to separate and process the expression separately from the remaining standard character text. Typical methods of parsing two-dimensional expressions rely on heuristic methods that analyze specific attributes and characteristics for detecting mathematical expressions. For example, some heuristic methods determine the average amount of the white space above, below and between the text lines, as well as the location and size of characters. Such methods may be error prone and may not detect formula description text lines which may consist of a mixture of text and embedded expressions. Other methods may be computationally intensive, including multiple analysis steps such as global and a local segmentation.

Therefore, aspects and embodiments are directed to a system and method that detects mathematical expressions in a document without use of heuristic methods. According to one embodiment, the system includes an OCR engine which detects different types of equation blocks based on character density of different character types. The methods and systems described result in a number of benefits, including faster processing time and higher accuracy.

According to one embodiment, a computer-implemented method of extracting formulas in an electronic image of a document using optical character recognition (OCR) is disclosed. The method comprises analyzing, by a computer system, the electronic image, including a plurality of text lines, to generate a plurality of bounding blocks, each bounding block associated with a text line detected within the electronic image.

The method further comprises searching the plurality of text lines to detect at least one character matching one of a plurality of character groups, calculating a symbol density of each of the plurality of character groups for each of the plurality of text lines, and classifying each of the plurality of text lines as at least one of an equation block type, an inline equation block type, and a descriptive block type, based on the symbol density. The method further includes extracting at least one bounding block associated with each of the plurality of text lines classified as the equation block type, and processing a set of the plurality of text lines remaining using OCR to produce an output document.

In one example, the plurality of character groups may include at least one of a mathematical symbol group, an italic symbol group, a standard character group, and an unknown symbol group. In addition, the mathematical symbol group may include at least one of operators, alphabetic characters, and numbers. The unknown symbol group may include symbols detected with recognition confidence level below a predetermined threshold. In one example, the method may further comprise determining a pruning classifier that identifies the at least one character as at least one of a mathematical symbol and a standard character. In this example, the method may further comprise determining a full classifier that identifies the at least one character as an italic symbol.

In various examples, the method further includes classifying each of the plurality of text lines as the equation block type in response to a determination that the symbol density of the group of mathematical symbols is greater than a first predetermined threshold. In addition, the method further includes classifying one of the plurality of text lines as the equation block type in response to a determination that includes determining the symbol density of the group of mathematical symbols to be greater than a second predetermined threshold, and determining the symbol density of the group of mathematical symbols and the italic symbols to be greater than a mixed character threshold.

According to another embodiment, a system for extracting formulas in an electronic image of a document using optical character recognition (OCR) is disclosed. The system comprises an OCR engine configured to receive the electronic image of the document, the OCR engine configured to analyze the electronic image to detect a plurality of text lines within the electronic image, and generate a bounding block for each text line, resulting in a plurality of bounding blocks.

The OCR engine is further configured to search the plurality of text lines to detect a plurality of character types, determine a symbol density for each of the detected plurality of character types for each of the plurality of text lines, classify each of the plurality of text lines as at least one of an equation block type, an inline equation block type, and a descriptive block type, based on the symbol density.

In response, the OCR engine is configured to extract at least one bounding block associated with each of the plurality of text lines classified as the equation block type and process a set of the plurality of text lines remaining using OCR to produce the output document.

In the system, the plurality of character types includes groups of at least one of mathematical symbols, italic symbols, standard characters, and unknown characters. Further in the system, the OCR engine is configured to determine a pruning classifier that identifies the at least one character as at least one of a mathematical symbol and a standard character, and determine a full classifier that identifies the character as an italic symbol.

In the system, the OCR engine is further configured to classify one of the plurality of text lines as the equation block type, extract as an image the at least one bounding block associated with one of the plurality of text lines classified as the equation block type, and reproduce the image in the output document. In addition, the OCR engine is further configured to classify one of the plurality of text lines as the equation block type in response to a determination that the symbol density of the mathematical symbols is greater than a first threshold.

In one example, the OCR engine is further configured to classify one of the plurality of text lines as the equation block in response to determining the symbol density of the mathematical symbols to be greater than a second threshold, and determining the symbol density of the mathematical symbols and the italic symbols to be greater than a mixed character threshold.

In another example, the OCR engine is further configured to classify one of the plurality of text lines as the equation block type, classify one of the plurality of text lines classified as the equation block type as the inline block type as a result of determining at least one of a vertical distance, a horizontal alignment and a height ratio. In at least on example, the OCR engine is further configured to detect the plurality of text lines within the electronic image by joining nearby horizontal chains.

According to another example, a non-transitory computer readable medium having stored thereon sequences of instruction for extracting formulas in an electronic image of a document using optical character recognition (OCR) is disclosed. The instructions will cause a processor to analyze the electronic image, including a plurality of text lines, and to generate a plurality of bounding blocks, each bounding block associated with a text line detected within the electronic image.

In addition, the instructions will cause the processor to search the plurality of text lines to detect at least one character matching one of a plurality of character groups, calculate a symbol density of each character group for each of the plurality of text lines, and classify each of the plurality of text lines as at least one of an equation block type, an inline equation block type, and a descriptive block type, based on the symbol density. Further, the instructions will cause the processor to extract at least one bounding block associated with each of the plurality of text lines classified as at least one of the equation block type, and the inline equation block type, and process a set of the plurality of text lines remaining using OCR to produce an output document.

In one example, the non-transitory computer readable medium further includes sequences of instructions, including instructions that will cause a processor to search the plurality of text lines to detect the at least one character matching one of the plurality of character groups including groups of at least one of mathematical symbols, italic symbols, standard characters, and unknown characters.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

As described above, traditional methods of parsing equations either rely on heuristic methods, which are error prone, or are computationally intensive. Accordingly, there is a need for a system and method of equation detection that is highly accurate and is able to quickly process any scientific or mathematical text or publication.

According to one embodiment, the system includes an Optical Character Recognition (OCR) engine that receives an imaged or scanned document. The OCR engine analyzes the imaged or scanned document to detect a plurality of text lines and generates a plurality of bounding blocks for each line of text in the imaged document. The text lines are searched to detect different character types within the text lines, such as mathematical and italic symbols. A symbol density for each character type may be determined for each detected character type.

In one embodiment, the OCR engine classifies the plurality of text lines into block types based on the symbol density. For example, block types may be equation blocks, inline equation blocks and description equation blocks. The OCR engine extracts at least the equation blocks from the plurality of bounding blocks and outputs the equation blocks as images into the output document. The remaining blocks may be either processed using special processing methods or using standard OCR character processing methods to produce an output document.

Figure 1:
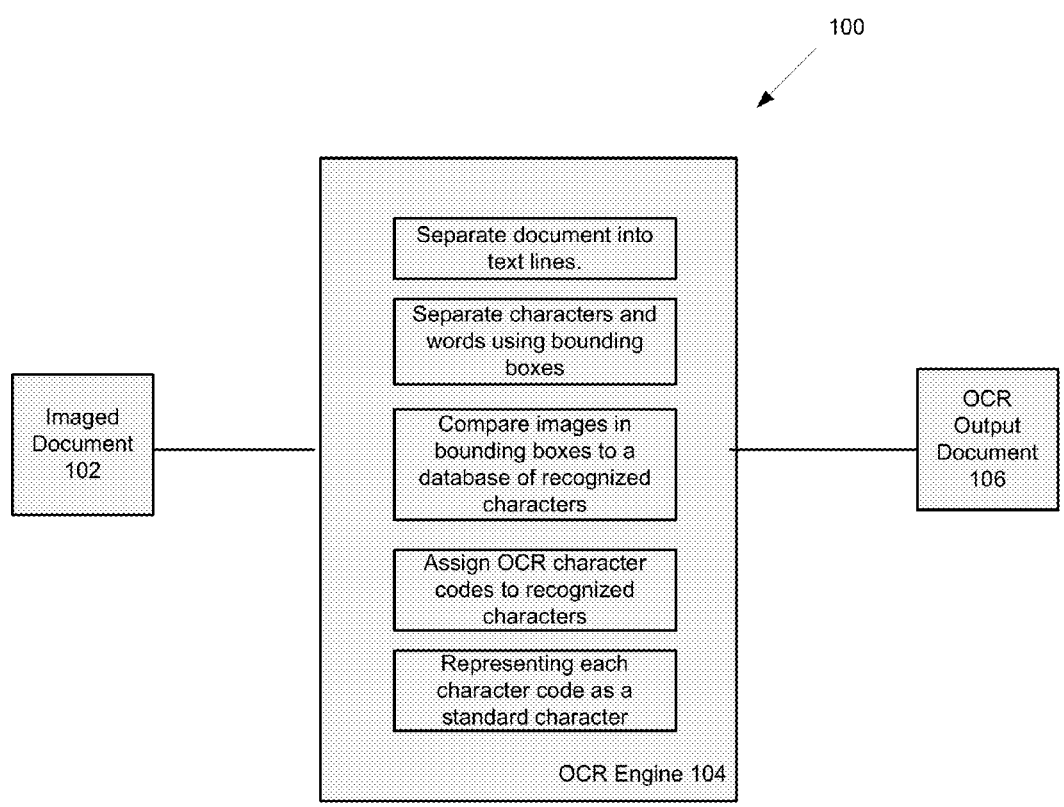
FIG. 1 is a diagram of a system for processing a scanned document using an Optical Character Recognition (OCR) engine.

Referring to FIG. 1, there is illustrated one example of a system 100 for processing a scanned document using an OCR engine 104. An imaged document 102, which may be scanned from a book or another publication, is received by the OCR engine 104. Elements of the system 100 can be provided using a computing system such as the computer system 400 of described with reference to FIG. 4.

According to various examples, the OCR engine 104 can separate the imaged document into a plurality of text lines. The text lines are separated using rectangular bounding boxes intended to enclose the text written on each page. When the document image has gray scale or color information, the OCR engine binarizes the image so that each image pixel is determined to be either a foreground pixel (e.g., black text) or a background pixel (e.g., a white region). Once the text lines are separated, the OCR engine generates a bounding box which normally encloses one or more connected groups of text pixels of one character or word perceived by the OCR engine. The words may be further separated into characters using bounding boxes using different types of methods.

The OCR engine 104 may assign to each character bounding box one or more OCR character codes. Each OCR character code identifies one or more characters that the engine has recognized in the bounding box. If the OCR engine 104 fails to recognize any character in a bounding box, the OCR engine may assign no OCR character code to the bounding box and other post-processing methods can be used to process these characters. Each character identified by the OCR character code can be represented as a standard character, for example, encoded as an ASCII or a Unicode encoded character. Using the character codes and the represented standard characters, the OCR engine 104 produces an output document 106 which represents the imaged document in standard character form.

Each bounding box can be thought of as a clipping path that isolates a portion or small image of the document image, whether in an original form or a binarized binary form. Because these small images can be thought of as being "clipped" from the document image by their respective bounding boxes, these small images will be referred to as "clips" or "clip images." Because each clip image may be tied to a bounding box, the OCR character code or codes, and hence the character or characters, assigned to a bounding box can also be referred to or identified as the codes or the characters assigned to the clip image.

Figure 2:
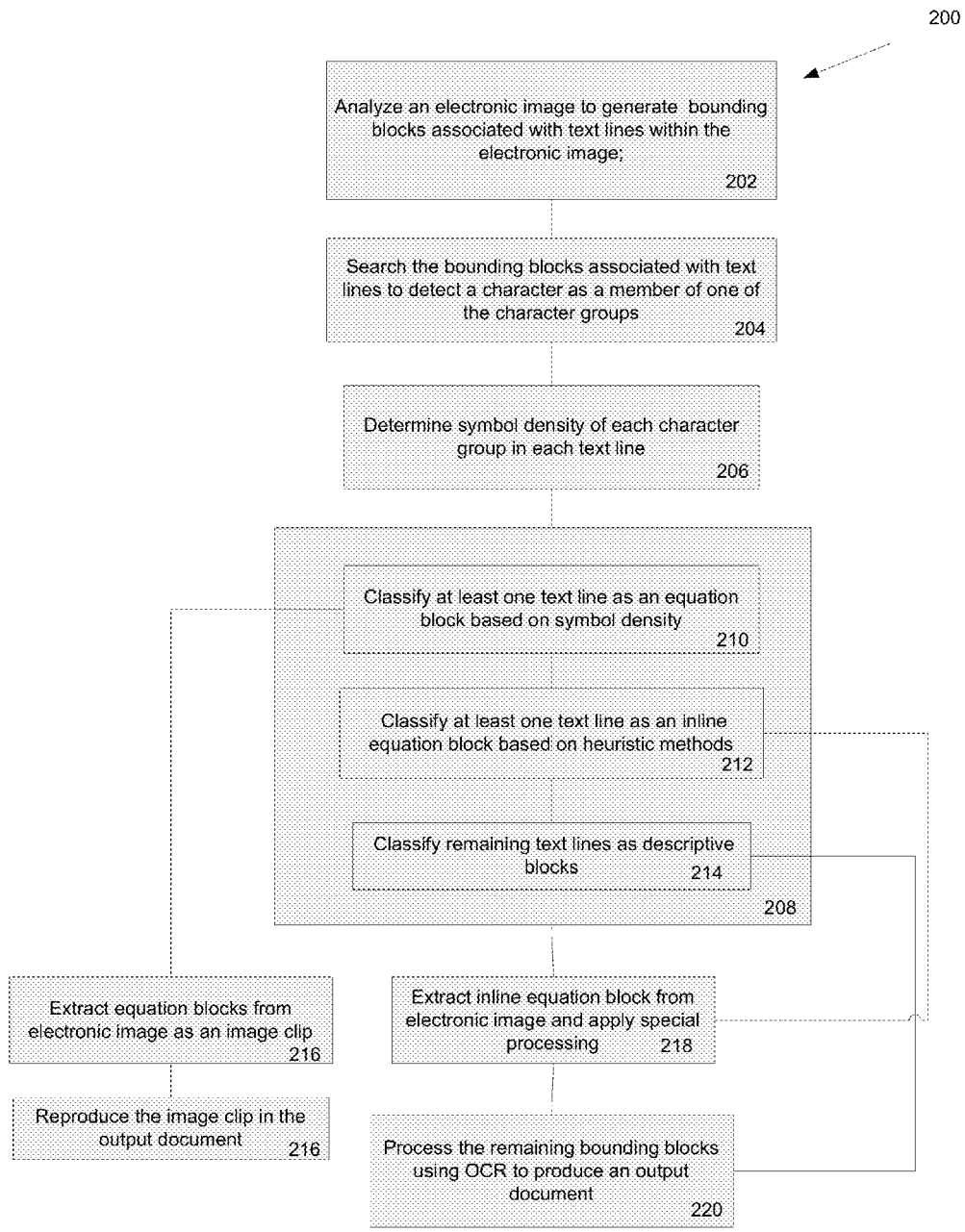
FIG. 2 is a flow diagram of a method of detecting equations in a scanned document, according to one embodiment.

As described above, the OCR engine (e.g., OCR engine 104) can be used to detect and process mathematical expressions or formulas. However, it can be appreciated that this detection method can also be used to detect chemical formulas or other two-dimensional expressions. FIG. 2 shows one example of a method 200 of detecting and processing mathematical expressions or formulas using the computer systems described below with reference to FIG. 4. The method 200 includes steps of generating bounding blocks from a plurality of text lines detected in a scanned document, detecting symbol density of mathematical and italic symbols, classifying the text lines into different types of equation blocks and descriptive text blocks and extracting equation blocks associated with particular equation block types.

In step 202, the OCR engine analyzes the received imaged document to generate bounding blocks associated for the plurality of text lines in the imaged document. To generate the bounding blocks, the OCR engine may first detect the text lines within the imaged or scanned document. Detecting text lines may be accomplished through any number of methods currently known. For example, one method of text line detection includes processing of horizontal chains of connected clip images. In this method, according to one example, nearby horizontal chains are joined into text lines provided that the joined chains do not go cross column boundaries or introduce additional vertical overlap of the text lines. This method may maximize the width of the text line while minimizing vertical overlap between the text lines.

Once the text lines are detected, the OCR engine searches the text lines to detect whether a character matches one of the predefined character groups (Step 204). For example, character groups may include a mathematical symbol group which may include symbols or operands such as limits, summation, integration, equals, less than or greater than signs, arrows, square roots, absolute value or other mathematical characters. The mathematical group may also include numeric characters (i.e., 1, 2, 3), as well as characters in other languages, such as Greek or Hebrew characters. The character groups may further include an italic character group which may include any characters in the italic characters. Symbols or characters with low recognition confidence can be categorized into an unknown character group. It is appreciated that different character groups may be defined including different combinations of characters.

In one embodiment, to detect different character groups, the OCR engine first analyzes one or more training sample documents. One example of a training sample document may include a combination of standard characters, mathematical symbols, and font families, which allows the OCR engine to produce a training data set of characters or classifiers that the OCR engine can later use as a basis of comparison. In one example, the OCR engine may be configured to analyze two training samples. The OCR engine may analyze a first training sample that may include mathematical symbols and a second training sample that may include standard characters, both of which may include characters of multiple font families including italic characters. Each character that is accurately detected is added to one or more classifiers as training data to generate an adaptive classifier for each recognized character.

In one example, the OCR engine may include two classifiers. The first classifier may include a pruning classifier which identifies a character by matching the character to either a standard character or a mathematical symbol. The second classifier may include a full classifier which may identify the character by matching the character to a particular font family, for example, "italic" or "Serif." According to some examples, for each character analyzed, the OCR engine identifies the character type as either a mathematical symbol, or as an italic symbol.

In step 206, the OCR engine may detect symbol density of each character group for each of the one or more text line bounded blocks. In one embodiment, density may be calculated as a mean, by first counting the number of each symbol for each character group and then by dividing the total number of symbols in a particular bounded text line. For example, one example of an equation block may include a total of Z characters with X number of mathematical symbols, Y number of italic symbols, U number of unknown characters and S number of standard characters. The mathematical symbol density ($d_1$) may be calculated by X divided by Z, italic symbol density ($d_2$) can be calculated by Y divided by Z, unknown character density can be calculated by U divided by Z and standard character density can be calculated by S divided by Z.

Figure 3:
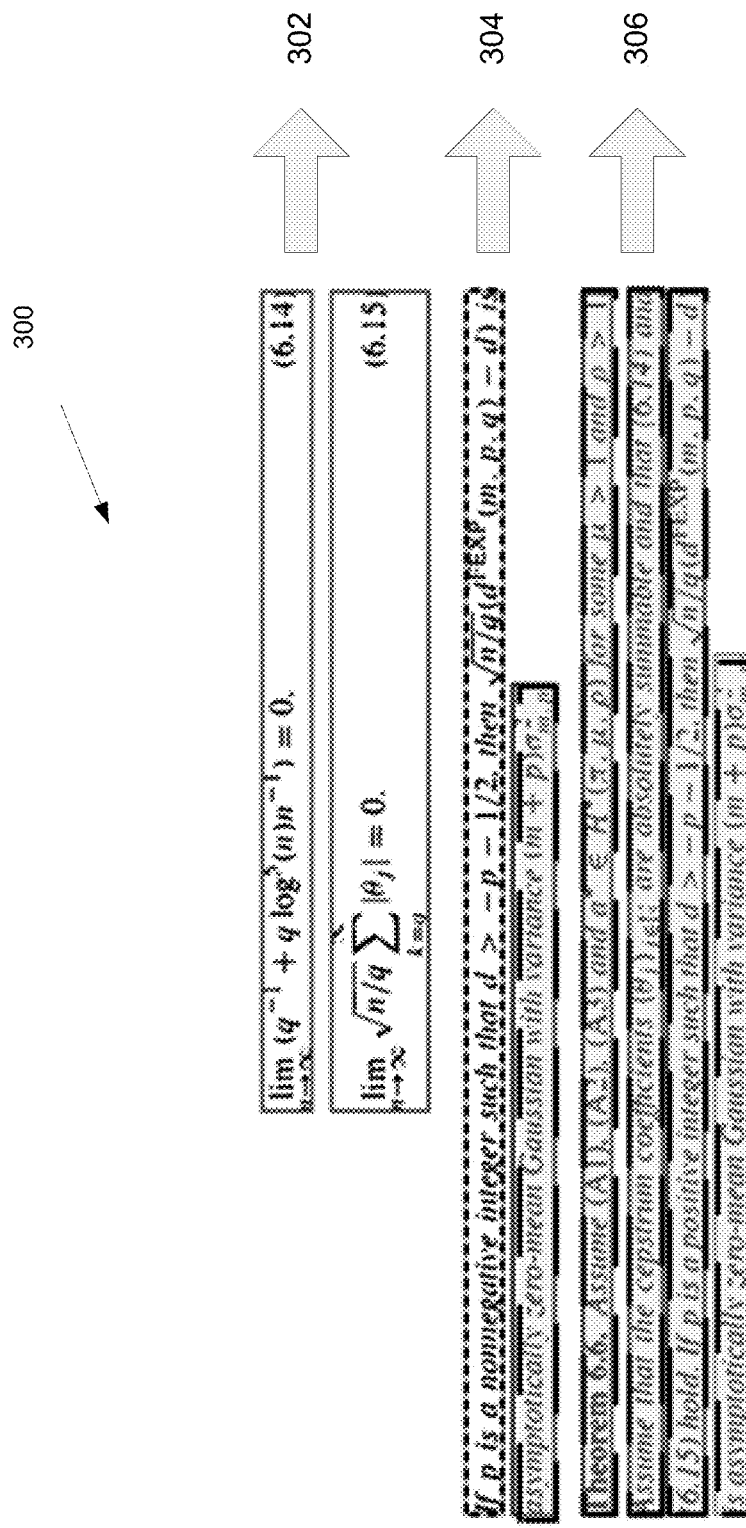
FIG. 3 is a diagram of one example of detected equations in a scanned document, according to one embodiment.

In step 208, the OCR engine may classify the one or more text lines into at least one block type based on the symbol density. In at least one example, the block types may include three types of block types: equation blocks, inline equation blocks and descriptive text blocks. FIG. 3 shows one example of a mathematical expression 300 that could be detected by the OCR engine 104. The mathematical expression 300 includes different types of expressions embedded within. For example, the mathematical expression 300 includes equation blocks 302, inline equation blocks 304, and descriptive text blocks 306.

In step 210, the OCR engine may classify the one or more text lines into at least one equation block. Equation blocks 302 may include distinct mathematical expressions mixed with other components. Such equations often express relationships between known variables and variables yet to be determined (e.g. the unknowns). Equation block 302 may also include identifying notation which may allow easy reference to a particular equation block. In at least one example, the equation blocks 302 may be detected based on a high density number of mathematical, and special characters and lower densities of standard characters.

According to one embodiment, high mathematical symbol density may include a predetermined number of mathematical symbols above a first threshold (T_high), while low mathematical symbol density may include a predetermined number of mathematical symbols below a second threshold (T_low). In addition, a mixed threshold (T__3) may be determined as a predetermined number of both math symbols and italic symbols. In one example, the bounding block may be detected as an equation block if the mathematical symbol density (d1) is greater than T_high. Alternatively, the bounding block may be detected as an equation block if the mathematical symbol density (d1) is greater than T_low and d2+d1 is greater than T__3, expressed as:

$$d1 > T\_high,$$

OR $$d1 > T\_low$$

and $$d2 + d1 > T\_3 \quad \text{(Equation 1)}$$

According to some examples, the thresholds (T_high, T_low and T__3) may be determined and set using empirical methods by reviewing the output document. Because different texts or publications may contain different densities of mathematical and italic symbols, in at least one example, each of the thresholds may be separately determined for each text or publication. In step 212, the OCR engine may classify the at least one equation block as an inline equation block. Inline equation blocks 304 may include a mixture of mathematical expressions and descriptive text. In one example, these inline equation blocks 304 are located below the equation blocks 302 and may also describe or identify variables within the equation blocks 302. In one example, inline equation blocks can also include high densities of mathematical and italic symbols and medium densities of standard characters.

According to some examples, heuristic methods are used to identify inline equation blocks 304. The features such as vertical distance, horizontal alignment and height ratio of a text line can be used to classify the equation block as the inline equation block. In one example, first the vertical distance between a particular text line and its neighbor text lines is determined (D). Second, the horizontal alignment ratio of a particular text line and its neighbor text lines can then determined (A). Third, height ratio between the particular text line and its neighbor text lines can then be determine (H). The particular text line is classified as an inline equation block if:

$$D < T\_1;$$

$$A > T\_line;$$

and $$H > T\_line2 \quad \text{(Equation 2)}$$

where T1__1, T_line and T_line2 may be predetermined thresholds. In one example, Tline and Tline2 may be 0.5.

In step 214, the OCR engine may classify the remaining text lines as descriptive text line blocks 306. Descriptive text blocks 306 may be part of the body of the scanned document and may include a number of variables described within the text. The descriptive text block types can include lower densities of mathematical and italic symbols and higher densities of standard characters.

As described above, in some examples, because of the higher mathematical and italic symbol densities, the OCR engine may not be able to process the equation blocks with a high degree of accuracy. According to one embodiment, in step 216, the OCR engine may extract at least one equation block 302 from the one or more text line bounding blocks based on the determination of the mathematical symbol density. In one example, the OCR engine may extract just the equation block types 302 from the scanned document. In other examples, the OCR engine may extract inline equation block types 304 in addition to the equation block types 302

In steps 216 and 218, the OCR engine may process equation blocks, inline equation blocks and any remaining descriptive text line blocks to produce an output document. According to some implementations, different types of processing may be applied to different types of blocks. According to some examples, the equation blocks 302 are marked as image types and reproduced as images in the output document (step 216). Inline blocks 304, in some examples, are processed as text blocks using standard OCR character processing methods. The remaining descriptive text line blocks 304, in some examples, are processed as text using standard OCR character processing methods (step 220).

In step 218, according to some examples, the inline equation blocks 304, are extracted and processed using specially designed character processing. For example, such character processing may further divide inline equation blocks into separate equation blocks and descriptive text blocks. The equation blocks within the inline equation blocks may be marked as image types and reproduced as images in the output document, while the remaining text blocks may be processed using standard OCR character processing methods.

According to various embodiments, using detecting and extracting mathematical formulas can improve the overall accuracy of OCR character processing and specifically by reducing the number of falsely detected characters. In testing the method 200, according to one example, two different versions of the output document are generated, including one using the method 200 to detect and extract mathematical formulas, and another without the use of the method 200. Each of the resulting output documents are compared by determining the total number of text lines that are mistakenly determined to be equations blocks. A region level false alarm can be generated for any regions including equation blocks, or other types of blocks such as images blocks, which may have been falsely labeled as text blocks. Similarly, a character level false alarm can be generated for any mathematical symbols which are falsely classified as standard characters. In one example of testing the method 200, 1500 books were processed. The result shows that the number of overall false region level alarms has decreased by 0.4% and false character level alarms decreased by 0.15%.

Example Computer Implementations

Various aspects and functions described herein, in accord with aspects of the present invention, may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software.

Figure 4:
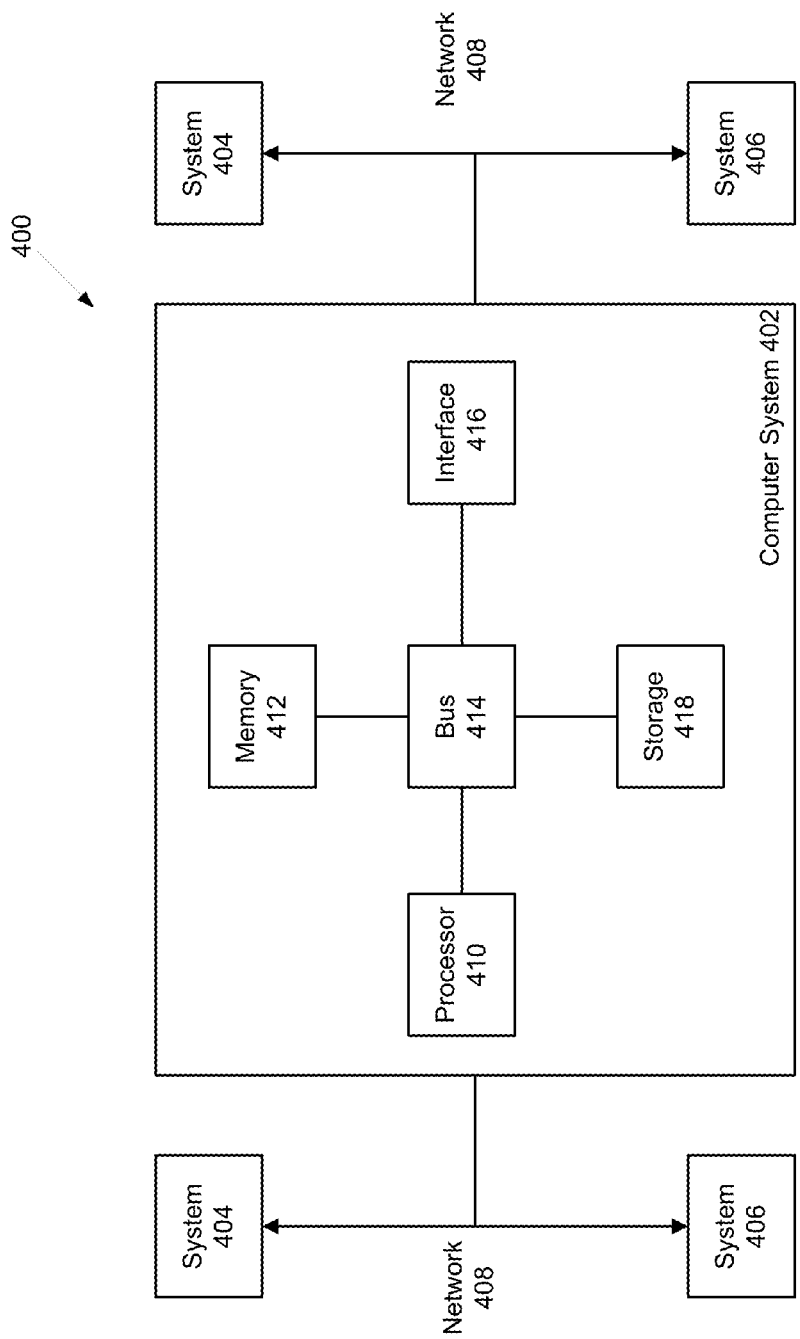
FIG. 4 is a block diagram of one example of a computer system that may be used to perform processes and functions disclosed herein.

FIG. 4 shows a block diagram of a distributed computer system 400, in which various aspects and functions in accord with the present invention may be practiced. The distributed computer system 400 may include one more computer systems. For example, as illustrated, the distributed computer system 400 includes three computer systems 402, 404 and 406. As shown, the computer systems 402, 404 and 406 are interconnected by, and may exchange data through, a communication network 408. The network 408 may include any communication network through which computer systems may exchange data. To exchange data via the network 408, the computer systems 402, 404 and 406 and the network 408 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 402, 404 and 406 may include mobile device such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 104 and other computing devices in the network.

To ensure data transfer is secure, the computer systems 402, 404 and 406 may transmit data via the network 408 using a variety of security measures including TSL, SSL or VPN, among other security techniques. While the distributed computer system 400 illustrates three networked computer systems, the distributed computer system 400 may include any number of computer systems, networked using any medium and communication protocol.

Various aspects and functions in accord with the present invention may be implemented as specialized hardware or software executing in one or more computer systems including the computer system 402 shown in FIG. 4. As depicted, the computer system 402 includes a processor 410, a memory 412, a bus 414, an interface 416 and a storage system 418. The processor 410, which may include one or more microprocessors or other types of controllers, can perform a series of instructions that manipulate data. The processor 410 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 410 is connected to other system placements, including a memory 412, by the bus 414.

The memory 412 may be used for storing programs and data during operation of the computer system 402. Thus, the memory 412 may be a relatively high performance, volatile, random access memory such as a dynamic random access memory (DRAM) or static memory (SRAM). However, the memory 412 may include any device for storing data, such as a disk drive or other non-volatile storage device, such as flash memory or phase-change memory (PCM). Various embodiments in accord with the present invention can organize the memory 412 into particularized and, in some cases, unique structures to perform the aspects and functions disclosed herein.

Components of the computer system 402 may be coupled by an interconnection element such as the bus 414. The bus 414 may include one or more physical busses (for example, busses between components that are integrated within a same machine), and may include any communication coupling between system placements including specialized or standard computing bus technologies such as IDE, SCSI, PCI and InfiniBand. Thus, the bus 414 enables communications (for example, data and instructions) to be exchanged between system components of the computer system 402.

Computer system 402 also includes one or more interface devices 416 such as input devices, output devices and combination input/output devices. The interface devices 416 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 416 allow the computer system 402 to exchange information and communicate with external entities, such as users and other systems.

Storage system 418 may include a computer-readable and computer-writeable nonvolatile storage medium in which instructions are stored that define a program to be executed by the processor. The storage system 418 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein.

A medium that can be used with various embodiments may include, for example, optical disk, magnetic disk or flash memory, among others. In operation, the processor 410 or some other controller may cause data to be read from the nonvolatile recording medium into another memory, such as the memory 412, that allows for faster access to the information by the processor 410 than does the storage medium included in the storage system 418. The memory may be located in the storage system 418 or in the memory 412. The processor 410 may manipulate the data within the memory 412, and then copy the data to the medium associated with the storage system 418 after processing is completed. A variety of components may manage data movement between the medium and the memory 412, and the invention is not limited thereto.

Further, the invention is not limited to a particular memory system or storage system. Although the computer system 402 is shown by way of example as one type of computer system upon which various aspects and functions in accord with the present invention may be practiced, aspects of the invention are not limited to being implemented on the computer system, shown in FIG. 4. Various aspects and functions in accord with the present invention may be practiced on one or more computers having different architectures or components than that shown in FIG. 4. For instance, the computer system 402 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 402 may include an operating system that manages at least a portion of the hardware placements included in computer system 402. A processor or controller, such as processor 410, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method of extracting formulas in an electronic image of a document using optical character recognition (OCR), the method comprising:

analyzing, by one or more computing devices, the electronic image, including a plurality of text lines, to generate a plurality of bounding blocks, each bounding block associated with a text line detected within the electronic image, wherein each of the one or more computing devices comprises one or more processors;

searching, by the one or more computing devices, the plurality of text lines to detect at least one character matching one of a plurality of character groups;

calculating, by the one or more computing devices, a symbol density of each of the plurality of character groups for each of the plurality of text lines;

classifying, by the one or more computing devices, each of the plurality of text lines as at least one of an equation block type, an inline equation block type, and a descriptive block type, based on the symbol density;

extracting, by the one or more computing devices, at least one bounding block associated with each of the plurality of text lines classified as the equation block type; and processing, by the one or more computing devices, a set of the plurality of text lines remaining using OCR to produce an output document.

2. The method of claim 1, wherein the plurality of character groups includes groups of at least one of mathematical symbols, italic symbols, standard characters, and unknown characters.

3. The method of claim 2, further comprising determining a pruning classifier that identifies the at least one character as at least one of a mathematical symbol and a standard character.

4. The method of claim 3, further comprising determining a full classifier that identifies the at least one character as an italic symbol.

5. The method of claim 2, further including classifying each of the plurality of text lines as the equation block type in response to a determination that the symbol density of the group of mathematical symbols is greater than a first predetermined threshold.

6. The method of claim 5, further including:
classifying one of the plurality of text lines as the equation block type in response to a determination that includes:
determining the symbol density of the group of mathematical symbols to be greater than a second predetermined threshold; and
determining the symbol density of the group of mathematical symbols and the italic symbols to be greater than a mixed character threshold.

7. The method of claim 2, further including:
classifying one of the plurality of text lines as the equation block type;
extracting as an image the at least one bounding block associated with one of the plurality of text lines classified as the equation block type; and
reproducing the image in the output document.

8. The method of claim 2, further including:
classifying one of the plurality of text lines as the equation block type;
classifying one of the plurality of text lines, classified as the equation block type, as the inline block type based on a determination of at least one of a vertical distance, a horizontal alignment and a height ratio.

9. The method of claim 1, wherein calculating the symbol density of each of the plurality of character groups further includes:
for each of the plurality of text lines, calculating a total number of characters in each of the plurality of character groups; and
dividing by a total number of characters in each of the plurality of text lines.

10. The method of claim 1, further comprising detecting the plurality of text lines within the electronic image of the document by joining nearby horizontal chains.

11. A non-transitory computer readable medium having stored thereon sequences of instruction for extracting formulas in an electronic image of a document using optical character recognition (OCR), including instructions that will cause a processor to:
analyze the electronic image, including a plurality of text lines, to generate a plurality of bounding blocks, each bounding block associated with a text line detected within the electronic image;
search the plurality of text lines to detect at least one character matching one of a plurality of character groups;
calculate a symbol density of each character group for each of the plurality of text lines;
classify each of the plurality of text lines as at least one of an equation block type, an inline equation block type, and a descriptive block type, based on the symbol density;
extract at least one bounding block associated with each of the plurality of text lines classified as at least one of the equation block type, and the inline equation block type; and
process a set of the plurality of text lines remaining using OCR to produce an output document.

12. The non-transitory computer readable medium of claim 11, further including sequences of instructions, including instructions that will cause a processor to:
search the plurality of text lines to detect the at least one character matching one of the plurality of character groups including groups of at least one of mathematical symbols, italic symbols, standard characters, and unknown characters.

* * * * *